June 25, 1935.  N. KRAFT  2,005,996
APPARATUS FOR HEAT TREATING CHEESE
Original Filed June 1, 1931  2 Sheets-Sheet 2
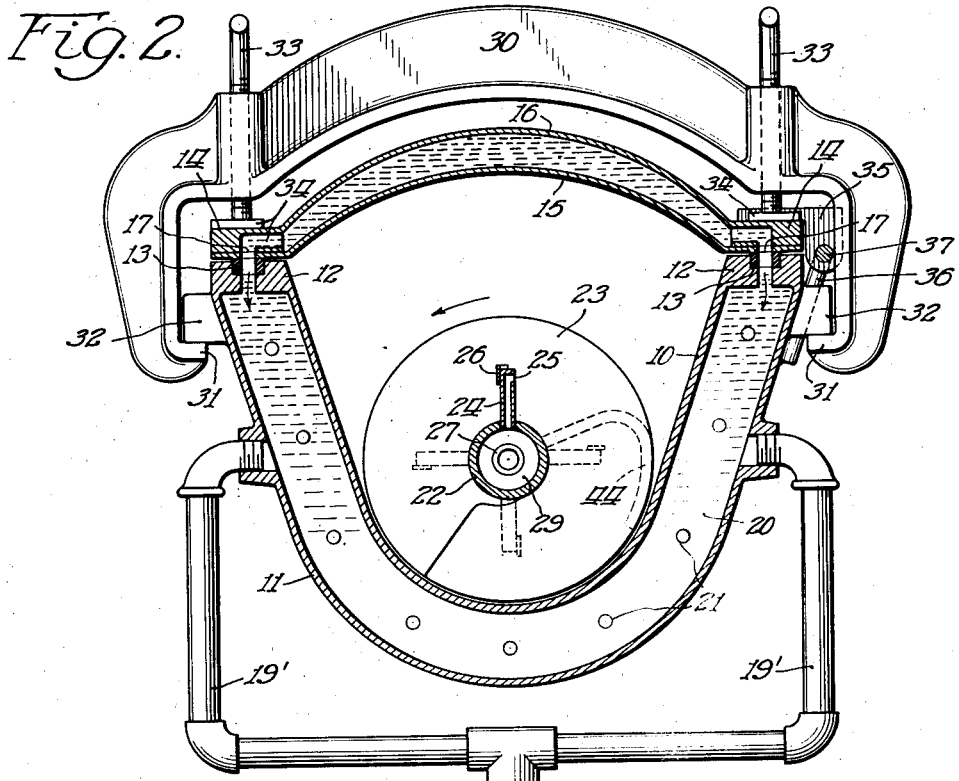
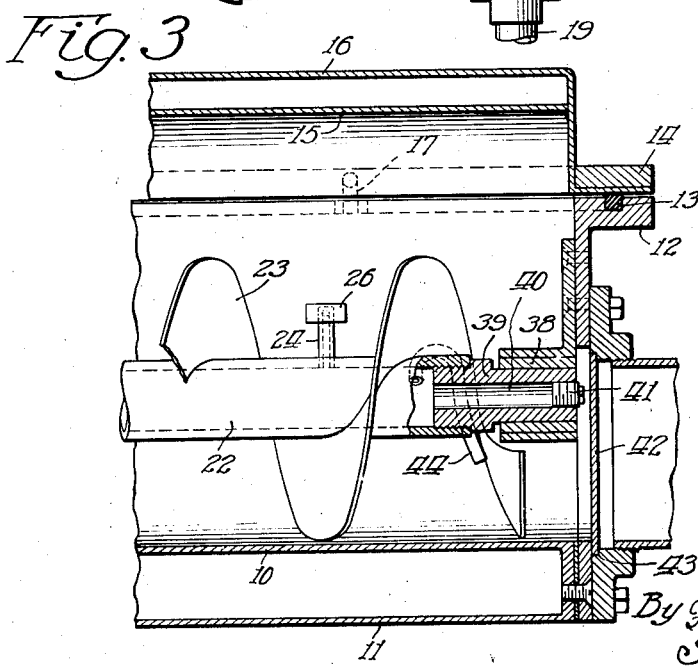
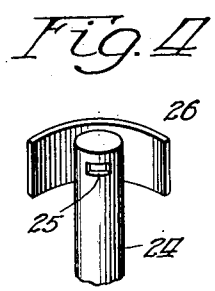
Inventor
Norman Kraft
By Fisher, Clapp,
Soans + Pond, Attys Patented June 25, 1935

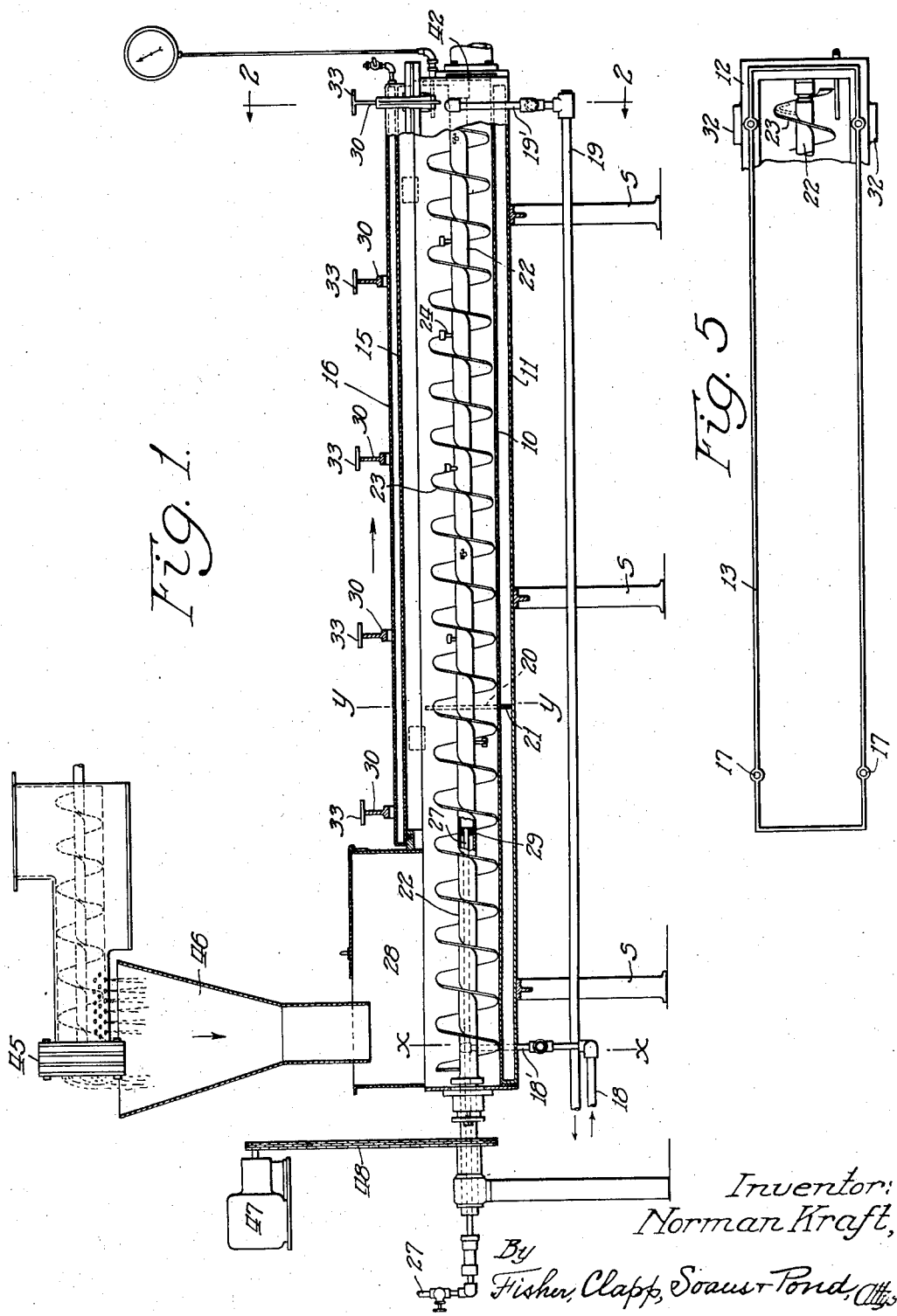

2,005,996

UNITED STATES PATENT OFFICE 2,005,996

APPARATUS FOR HEAT-TREATING CHEESE

Norman Kraft, Wilmette, Ill., assignor to Kraft-Phenix Cheese Corporation, Chicago, Ill., a corporation of Delaware Application June 1, 1931, Serial No. 541,163
Renewed October 22, 1934

6 Claims. (Cl. 99—2)

This invention relates to an improved process of and apparatus for heat-treating cheese, and is based on a process of treating cheese described and claimed in Letters Patent to James L. Kraft, No. 1,323,869, dated December 2, 1919.

As pointed out in the specification of the aforesaid patent, it is very important that the cooking and sterilizing temperature be maintained strictly within narrow limits to avoid injuring the quality of the product. And, in order to produce a cheese of the desired texture and moisture content and to insure greater uniformity, it is the practice to add a considerable percentage of water during the treatment.

The general object of the present invention is to provide an improved process of and apparatus for thus treating the cheese which will insure the superior and uniform quality of the product. Other objects are to shorten the period of the cooking operation, to provide an apparatus adapted to utilize both super-heated steam and hot water as the heating means, to provide an improved cooking chamber wherein the body of cheese undergoing treatment will be entirely surrounded by the heating medium so as to avoid local overheating or underheating in the batch, to provide means for insuring a uniform circulation of the hot water heating medium throughout the full length and circumference of the cooking chamber, to provide an improved means for introducing the superheated steam in, and thoroughly commingling it with, the batch, and to provide an improved means for maintaining the rear corner region of the cooking vessel clear of impacted cheese and insure that the entire batch be uniformly treated.

Still other objects and attendant advantages of the invention will be apparent to persons skilled in the art as the same becomes better understood by reference to the following detailed description, taken in connection with the accompanying drawings in which I have illustrated a practical and approved embodiment of the principle of the invention, and wherein—

Fig. 1 is a vertical axial section of the apparatus.

Fig. 2 is an enlarged transverse section taken on the line 2—2 of Fig. 1.

Fig. 3 is an enlarged vertical longitudinal section of the discharge end of the cooking chamber.

Fig. 4 is a perspective detail of one of the steam injector nipples on the worm shaft.

Fig. 5 is a top plan view of a gasket member located between the body and cover of the cooking vessel, a fragment of the body of the vessel and the worm appearing in top plan at the right of the figure.

Referring to the drawings, 10 designates the inner wall and 11 the outer wall of a substantially V-shaped trough commonly used in cookers of this type, the same being supported on standards S. Where the body of the vessel is a casting, these walls are united along their upper edges by horizontal walls 12 of substantial thickness, the upper surfaces of the walls 12 being channeled to receive a rectangular gasket 13, shown in isolated detail in Fig. 5. Seated on the gasket 13 are the longitudinal edge portions or flanges 14 of a hollow cover member comprising inner and outer walls 15 and 16. Near the rear or discharge end of the vessel, the interior of the hollow body of the vessel communicates with the interior of the hollow cover through registering ducts in the members 14, 13 and 12, designated as an entirety by 17; and near the receiving end of the vessel, in the vertical plane designated by the line x—x in Fig. 1, the body and cover communicate with each other by similar ducts 17.

Water at a temperature of approximately 175° F. is admitted through main and branch pipes 18 and 18' to the front end portion of the body jacket, and is discharged from the rear end portion through branch and main pipes 19' and 19. In order to insure that the hot water shall also enter and flow through the interior of the hollow cover, I insert in the body jacket, at a point in the vertical plane of the line y—y of Fig. 1, a partition 20 formed with a plurality of small spaced holes 21, these holes being of less cross sectional area than that of the branch inflow pipes 18'. A differential pressure is thus created on opposite sides of the partition 20, which causes the hot water to rise into and flow through the hollow cover, this water returning to the body of water in the body jacket through the ducts 17 shown in Fig. 2.

Journaled in and lengthwise of the cooking chamber is a hollow shaft 22, on which is mounted the usual spiral or worm 23, which acts to fill the chamber with the cheese stock and also as a stirrer. This hollow shaft 22 serves not only the function of a worm shaft, but also to admit superheated steam into the presence of the batch of cheese in the cooking chamber. The shaft is equipped at intervals of about one foot with short radial nipples 24 which are closed at their outer or free ends, as shown in Fig. 2, and are each provided with a lateral jet discharge opening 25. By reference to Figs. 2 and 4 it will be observed that the discharge opening 25 is on the rear side of the nipple, relatively to the direction of rotation of the shaft and worm; and attached to the upper end of the nozzle is a curved spreader plate or strip 26 that spreads the plastic mass of cheese on opposite sides of the orifice 25 and thus prevents the latter from becoming clogged. Superheated steam preferably at a temperature of around 500° F. is admitted through a pipe 27 which extends for some distance into the hollow worm shaft 22 below the receiving chamber 28 of the cooking vessel and at its inner end is mounted in a plug 29 that tightly fits the interior of the shaft 22.

The cover of the cooking vessel is tightly locked in place by yokes 30 that straddle the cover at intervals lengthwise of the latter, and terminate in hooks 31 (Fig. 2) that engage beneath lateral lugs 32 on the outer walls 11 of the body. Mounted in tapped openings of each yoke 30 are a pair of clamp screws 33 equipped on their lower ends with feet 34 that rest on top of the margin strips 14 of the cover. Manifestly, by turning up the screws 33, the cover is tightly clamped on the upper face of the gasket 13. Where a narrow gasket is used, as indicated in Fig. 5, the same is widened at the locations of the ducts 17 to permit the formation therein of the portions of said ducts formed in the gasket. The cover is preferably hinged on one longitudinal edge as by means of hinge leaves 35 and 36 on the cover and body respectively and pintles 37, so that, when necessary, the interior of the vessel can be reached for scouring or any other purpose.

Fig. 3 shows the journal bearing 38 for the rear end of the worm shaft 22, the journal or trunnion 39 being screwed into the end of the hollow shaft 22 and having an axial bore 40 normally closed by a screw plug 41. 42 designates the usual sliding gate mounted in a slideway 43 attached to the rear end wall of the cooking vessel, which is, of course, closed during the cooking operation, and is subsequently opened to permit the discharge of the batch when cooked.

Since the rear end of the worm or screw 23 does not scrape the end wall of the vessel, small masses of the stock tend to become packed against the latter; and to prevent this, and maintain the end wall and corners clear, I provide a curved pipe 44 that communicates at its inner end with the interior of the hollow shaft 22 and extends, as shown in Fig. 2, outwardly to and for some distance parallel with the periphery of the worm 23. A jet of steam continuously issuing from this pipe 44 strikes the rear corners of the cooking chamber and thus breaks up and disperses any lumps of cheese that would otherwise pack into the latter.

In Fig. 1 I have illustrated somewhat conventionally, the customary comminuter 45 by which the stock of cheese to be treated is cut into small particles, and the chute 46 by which the comminuted cheese is delivered into the receiver 28 of the cooking vessel. I have also indicated conventionally at 47 an electric motor connected by a chain or belt 48 to the rotary worm shaft 22; but as these last described features form no part of the present invention, detailed illustration and description thereof is not deemed necessary.

In the operation of the apparatus, water at a temperature of approximately 175° F. is circulated throughout the body and cover of the cooking vessel. At about the beginning of the operation of filling the vessel with cheese stock, which is accomplished by rotating the worm 23 at a speed of about 60 R. P. M., steam is turned on into the worm shaft, and after about four or five minutes, when the cheese has reached a temperature of about 125° F., the steam is turned off, and the heat received through the jacket completes the raising of the temperature to the required amount, which ordinarily is about 150° F. The superheated steam admitted directly into the presence of the cheese stock, of course, furnishes the water content which in the case of most cheeses treated, is employed.

By the herein described process and apparatus a batch of cheese is sterilized and cooked in about ten minutes—a period of time much shorter than has heretofore been required with previously known apparatus of a generally similar character.

I claim:

1. Apparatus for heat-treating comminuted cheese, comprising an elongated cooking chamber, a hollow shaft journaled in and lengthwise of said chamber, radial steam jet nipples on and communicating with said shaft, said nipples having closed outer ends and lateral discharge apertures, stirring means comprising a worm on and coextensive lengthwise with said shaft, and a steam supply pipe communicating with one end of said shaft.

2. Apparatus for heat-treating comminuted cheese, comprising an elongated cooking chamber, a hollow shaft journaled in and lengthwise of said chamber, radial steam jet nipples on and communicating with said shaft, said nipples having closed outer ends and lateral discharge apertures on their rear sides relatively to the direction of rotation of said shaft, stirring means comprising a worm on and coextensive lengthwise with said shaft, and a steam supply pipe communicating with one end of said shaft.

3. Apparatus for heat-treating comminuted cheese, comprising an elongated cooking chamber, a hollow shaft journaled in and lengthwise of said chamber, radial steam jet nipples on and communicating with said shaft, said nipples having closed outer ends and lateral discharge apertures on their rear sides relatively to the direction of rotation of said shaft, spreaders on the front sides of said nipples adapted to direct the stock under treatment away from said apertures as said shaft rotates, stirring means on said shaft, and a steam supply pipe communicating with one end of said shaft.

4. Apparatus for heat-treating comminuted cheese, comprising an elongated cooking chamber, a hollow shaft journaled in and lengthwise of said chamber, a worm on said shaft functioning to move the stock under treatment toward the rear end of said chamber, a steam supply pipe communicating with one end of said shaft, and means communicating with the interior of said shaft serving to direct a jet of steam into the corner region of the rear end of said chamber.

5. Apparatus for heat-treating comminuted cheese, comprising an elongated cooking chamber, a hollow shaft journaled in and lengthwise of said chamber, a worm on said shaft functioning to move the stock under treatment toward the rear end of said chamber, a steam supply pipe communicating with one end of said shaft, and a steam jet pipe communicating at its inner end with the interior of said shaft and having its outer end portion directed toward the corner region of the rear end of said chamber.

6. A vessel for heat-treating comminuted cheese, comprising a water jacketed body and a water jacketed cover therefor, the jackets of said body and cover having communicating ducts at opposite ends only of the vessel, a hot water supply pipe communicating with said body jacket, a partition in said body jacket between said ducts formed with one or more restricted flow holes of less cross sectional area than said supply pipe, and a hot water return pipe communicating with said body jacket on the opposite side of said partition from said supply pipe.

NORMAN KRAFT.